United States Patent

Gould et al.

Patent Number: 5,350,444

Date of Patent: Sep. 27, 1994

[54] PASSENGER VEHICLE WITH A FILTERED AIR INTAKE

[75] Inventors: David Gould, Winnipeg; Robert Wosner, Vermette, both of Canada

[73] Assignee: The Healthwise Auto Filter Inc., Winnipeg, Canada

[21] Appl. No.: 53,224

[22] Filed: Apr. 28, 1993

Related U.S. Application Data

[63] Continuation-in-part of Ser. No. 8,588, Jan. 25, 1993, abandoned.

[51] Int. Cl.⁵ .............................................. B60H 3/06
[52] U.S. Cl. .................................. 96/154; 96/153; 55/385.3; 55/491; 55/511; 454/158
[58] Field of Search ............... 96/153, 154; 55/385.3, 55/491, 511; 454/158

[56] References Cited

U.S. PATENT DOCUMENTS

| | | | |
|---|---|---|---|
| 2,505,175 | 4/1950 | Davis | 55/491 |
| 3,086,759 | 4/1963 | Goettl | 55/491 |
| 3,287,003 | 11/1966 | Goettl | 55/491 |
| 3,431,335 | 3/1969 | Henning | 55/511 |
| 3,538,686 | 11/1970 | Schwab | 55/491 |
| 3,870,495 | 3/1975 | Dixon et al. | 55/489 |
| 3,941,034 | 3/1976 | Helwig et al. | 55/484 |
| 4,250,172 | 1/1981 | Mutzenberg et al. | 428/234 |
| 5,221,292 | 6/1993 | Aoyama | 55/385.3 |

FOREIGN PATENT DOCUMENTS

| | | |
|---|---|---|
| 2621673 | 1/1978 | Fed. Rep. of Germany . |
| 2811419 | 9/1979 | Fed. Rep. of Germany . |
| 2813662 | 10/1979 | Fed. Rep. of Germany . |
| 2833374 | 2/1980 | Fed. Rep. of Germany . |
| 2845490 | 4/1980 | Fed. Rep. of Germany . |
| 2928247 | 1/1981 | Fed. Rep. of Germany . |
| 3512422 | 10/1986 | Fed. Rep. of Germany . |
| 3514038 | 10/1986 | Fed. Rep. of Germany . |

*Primary Examiner*—Tim Miles
*Attorney, Agent, or Firm*—Adrian D. Battison; Stanley G. Ade; Murray E. Thrift

[57] ABSTRACT

The air intake of a conventional automobile which is mounted in front of the windshield under the air intake cover at the rear of the hood is modified by the introduction into the duct of the air intake of a filtration pillow. The pillow is formed from a plurality of separate layers of filtration material including impregnated or particulate absorption material. The absorption material is arranged for extraction of combustion products particularly hydrocarbons, carbon monoxide, nitrogen oxides, soot and the like. The filter member can also prevent the entry of debris, leaves and the like together with the rodents or insects.

5 Claims, 4 Drawing Sheets

PASSENGER VEHICLE WITH A FILTERED AIR INTAKE

This is a continuation-in-part of application Ser. No. 08/008,588, filed Jan. 25, 1993 abandoned.

FIELD OF THE INVENTION

This invention relates to a passenger vehicle of the type having a vehicle body defining a passenger compartment with an air intake duct for drawing exterior air for emission into the passenger compartment, a fan mounted in the duct for drawing air into the intake and an air emission system within the passenger compartment for release of the air into the compartment.

Passenger vehicles and particularly automobiles are used to transport persons from place to place within a city and in most cases the motor propulsion of the passenger vehicle involves the production of combustion products which are released from the rear of one vehicle into the path of a following vehicle.

In many cities there is much concern about the level of air pollution particularly in the area of roads and freeways. The major thrust toward reduction of air pollution has been with regard to reducing the contaminants released during the combustion in the vehicle. However one area appears to have been fully overlooked which is that of preventing the entry of the contaminants into the passenger compartment by the provision of a filter member within the intake duct.

Some attempts have been made to apply a filter element into the air intake of a passenger vehicle. However, it is believed that none of these devices has been successful in the marketplace probably due to the complexity of manufacture and installation which has inhibited the public from using such devices.

However, the current attention to the environment and pollution has given a significant impetus to the desire for filtration of the air intake into the vehicle.

One proposed arrangement is shown in U.S. Pat. No. 3,870,495 (DIXSON) which shows a corrugated paper type filter of a relatively complex construction which is inserted into the duct in the form of a cup shape so that air enters the interior of the cup and passes through the paper filter material. This arrangement does not however take into account the specific designs of the intake duct system which is presently utilized in vehicles on the marketplace.

A filter construction is shown in U.S. Pat. No. 4,250,172 (MUTZENBERG) which discloses a plurality of layers of fibrous mat which are attached together by needling to form a pillow type filter body. However this patent makes no disclosure as to how the construction may be attached into the intake duct of a vehicle.

German Patent Application 2813662 [HOLTER] discloses a filter system in which filter pads are arranged in a duct transverse to the duct at spaced positions along the length of the duct. Again there is no disclosure as to how these may be fitted into existing intake duct systems of commercial automobiles.

It is one object of the present invention, therefore, to provide a design of a simple filter member which can be mounted in the intake duct of a passenger vehicle so as to extract common pollutants from the air drawn into the vehicle.

According to the present invention, there is provided a passenger vehicle comprising a vehicle body having a passenger compartment, an air intake duct for drawing exterior air for emission into the passenger compartment, a fan mounted in the duct for drawing air into the intake and a filter member mounted in the intake duct upstream of the fan, the filter member having a filter body arranged for extraction from air flowing therethrough of particulate materials and a filter medium in the filter body for extraction of combustion products, the filter body comprising a plurality of layers connected together to form a pillow, some of the layers comprising a non-woven mat of fibres, the duct having fastening means therein comprising at least one element adhesively fastened to a wall of the duct and having a plurality of flexible hooks carded on the element, the hooks engaging said non-woven mat of fibres to hold the filter body in place.

Preferably the filter member is in the form of a pillow formed by a number of layers of filter material which are attached together at quilt lines longitudinally and transverse of the filter member. The filter layers preferably include at least some intermediate layers carrying a filter medium for extraction of combustion products. Activated carbon in particulate form can be used for the filter medium in which case it is generally encapsulated between separate layers of the filter member.

Preferably the filter member is supplied as a rectangular body of dimensions generally larger than the air intake for many different vehicles so that the filter member can be cut to size along the quilt lines to match an internal cross section of the inner duct wall. The thickness of the pillow and the stiffness of the material is then sufficient to frictionally engage the side edges of the pillow with the inner duct wall to hold the pillow in position solely by that frictional engagement.

The pillow construction is of a filter material which is stacked in layers and quilted either by stitch lines or heat sealing for the purpose of holding an activated charcoal (carbon) or similar medium between the layers.

The conventional automobile includes a windshield in front of which is the hood and rearwardly of which is the passenger compartment. Under the hood is provided the engine compartment which is separated from the passenger compartment by a fire wall. In front of the windshield is provided a fresh air intake cover which is generally removable to provide access to the inlet duct. Different vehicles have a different arrangement of the intake duct but generally the duct includes a duct wall having an inner duct surface leading from the position underneath the intake cover to the fan positioned forwardly or rearwardly as required of the fire wall.

When the intake cover has been removed, the pillow can be cut to shape adjacent the quilt lines depending upon the dimensions of the intake duct of the vehicle concerned and the pillow can then be inserted into the intake duct and the cover replaced.

The purpose of the filter member is to remove or reduce dust, dirt, pollen, toxins or pollutants to prevent them entering into the interior of the passenger compartment. This can be used to improve problems such as general health, asthmatic conditions or dust and dirt buildup within the vehicle. The filter can also extract some moisture and can prevent entry of snow or ice particles to prevent humidity buildup within the vehicle which can lead to fogging of the windows.

A pillow type filter can provide a lifetime of the order of three to twelve months depending upon usage and depending upon the level of pollutants within the air.

In one example the proposed filter pillow can be of the order of 12 inches by 15 inches panel quilted in 3 inch or 2 inch diagonal squares so it can be readily cut to size to match the cross section of the intake duct. Most automobiles currently on the market have easy access to the underside of the intake cover to allow simple installation of the pillow into the duct by the frictional effect.

One embodiment of the invention will now be described in conjunction with the accompanying drawing in which.

DETAILED DESCRIPTION

Figure 1:
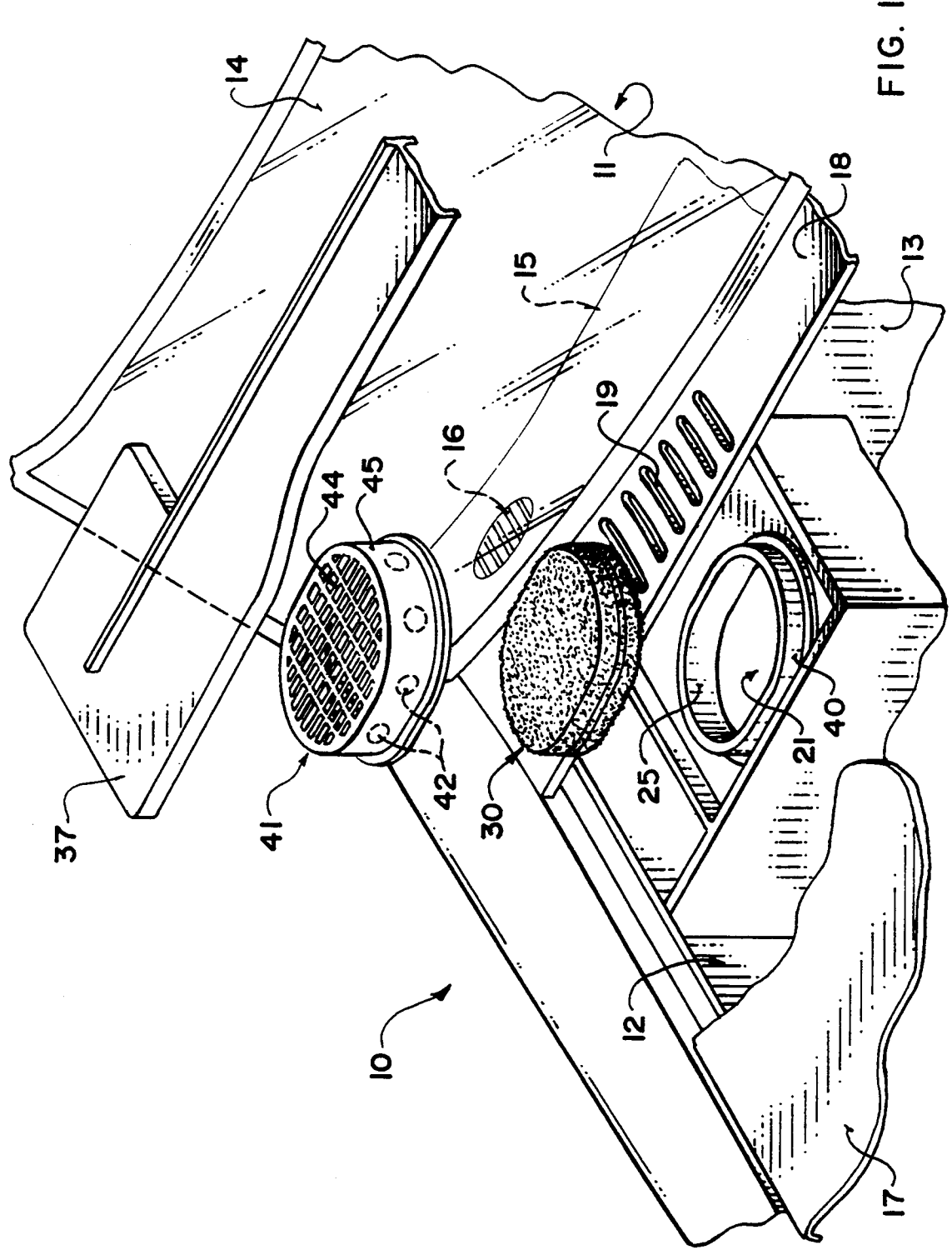
FIG. 1 is a partly broken away isometric view of a passenger vehicle showing the air intake and the filter member of the present invention in a first installation arrangement.
Figure 2:
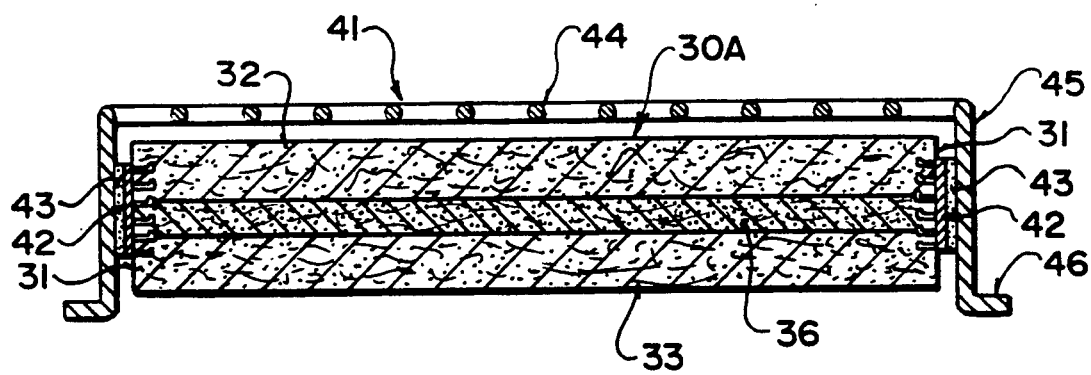
FIG. 2 is a cross sectional view through the inlet duct of the air intake of the passenger vehicle of FIG. 1.

A passenger vehicle as shown in FIG. 1 is generally indicated at 10 and includes a passenger compartment 11 and an engine compartment 12 which is separated from the passenger compartment by a fire wall 13. At the front of the passenger compartment is provided a windshield 14 positioned forwardly of a dash board 15 including air outlet vents 16. Above the engine compartment is provided a hood 17 and rearwardly of the hood is provided an air inlet cover 18 which extends across the front of the windshield and includes openings or louvers 19 through which air can be drawn into a compartment 20 underneath the cover 18.

Figure 3:
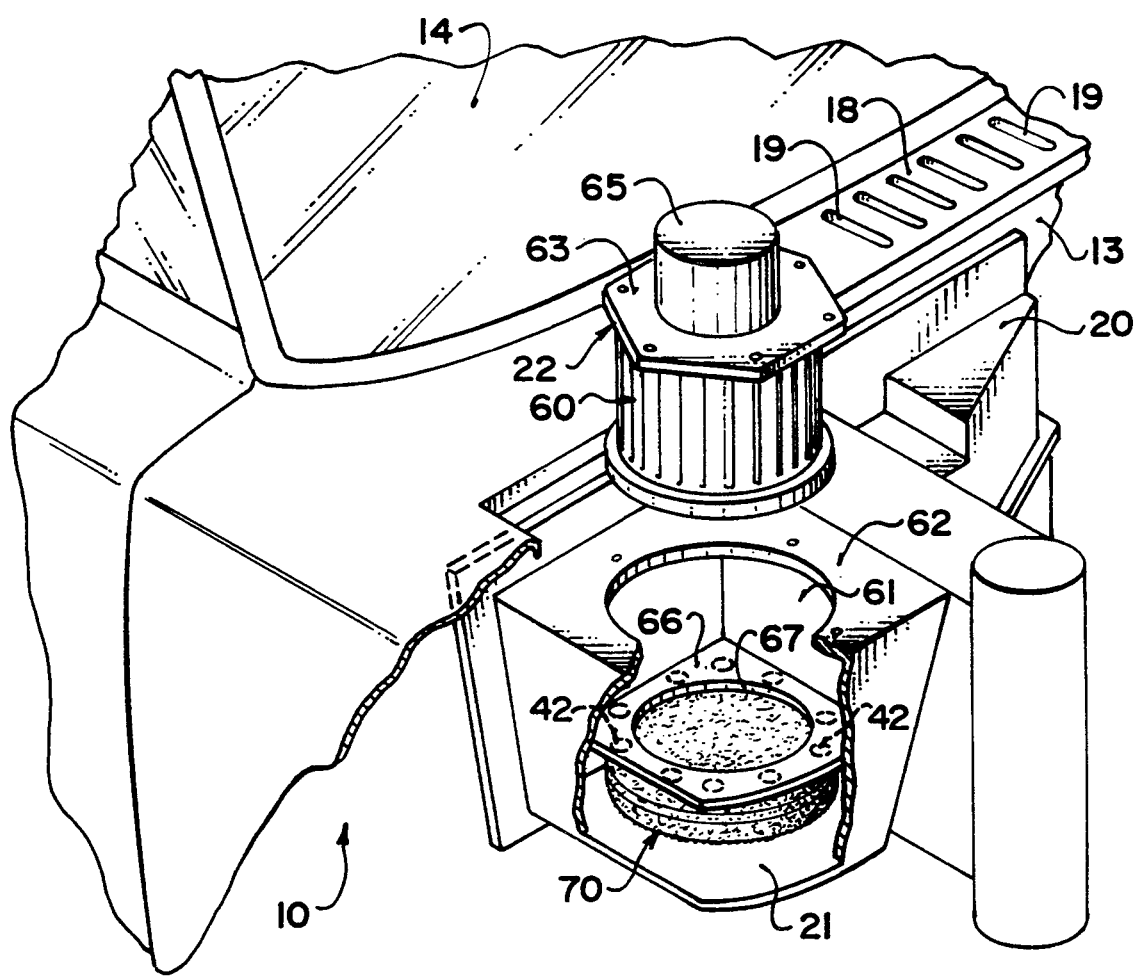
FIG. 3 is a view similar to that of FIG. 1 showing the air intake and filter member of the present invention in a second installation arrangement.

An air inlet system for drawing outside air into the passenger compartment includes a duct 21 mounted within the compartment 20 and leading to a fan housing 22 within which a fan 23 is mounted (See FIG. 3). The fan passes the air from the compartment 20 through an opening in the fire wall 13 with that air then escaping through the outlet 16.

Figure 7:
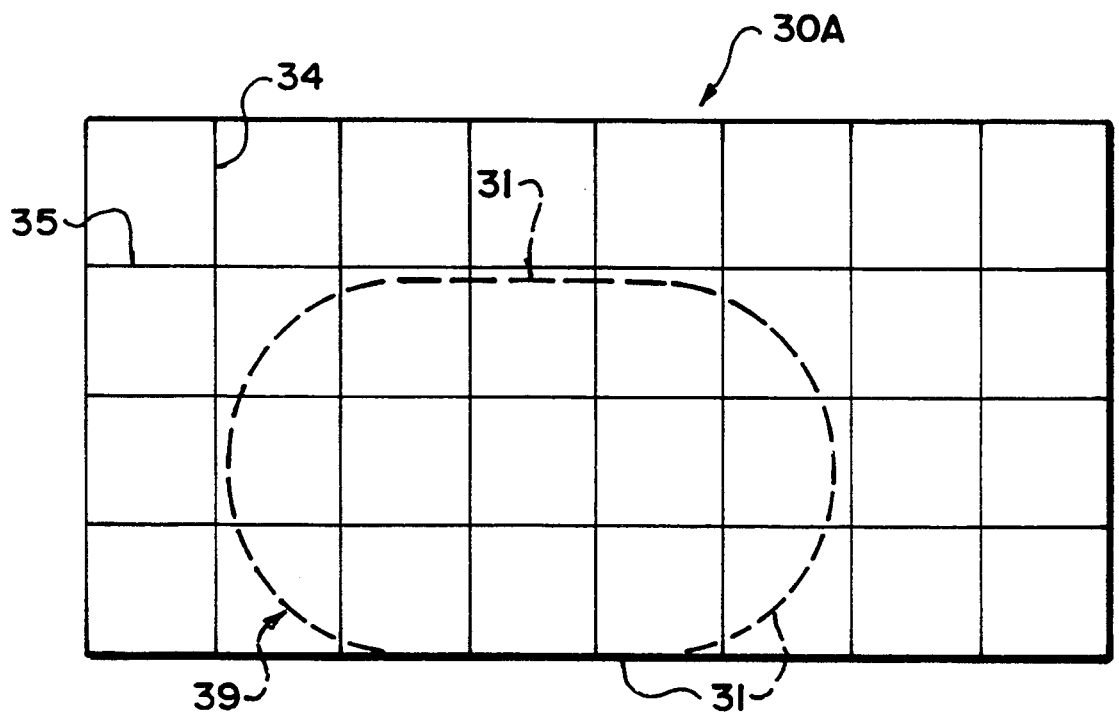
FIG. 7 is a front elevational view of a filter member as supplied in its initial form showing the shape cut to provide the insert for engagement into the duct of FIG. 2.

The vehicle of the present invention is modified by the addition of a filter member 30 which is mounted within the inner duct wail 25. The filter member comprises a pillow 30A formed of a plurality of layers 32, 33 etc. of a filter medium. The pillow 30A is formed from the layers which are co-extensive and terminate at defined side edges 31. The pillow is quilted by transverse and longitudinal quilt lines 34 and 35 (FIG. 7) or more preferably by diagonal arranged quilt lines formed either by stitching or by heat sealing to interconnect the layers. A number of the layers are formed from a conventional polyester filter material which is of the type formed from a non-woven mat of fibrous material. Intermediate the layers of the filter material are provided additional layers 36 which include an impregnated activated charcoal material carried within the layer. In one alternative the activated charcoal can be applied directly to a fibrous layer so as to be carried thereby. In an alternative arrangement the activated charcoal can be provided in powder or particulate form and carried between two layers of the filter material.

The layers are built up to a cushion having a thickness sufficient to provide a required filtration effect on the air drawn into the duct. In addition the thickness of the pillow is such that it has sufficient stiffness so that the side edge 31 of the pillow can engage against the inside surface or inner side wall 25 of the duct 21 to assist in holding the pillow in place.

In order to form the filter pillow into the required shape, an initial filter pillow of for example 12 inches by 15 inches can be cut along a cut line 39 to match the inside shape of the wall 25. The spacing between the quilt lines is selected so that in general the cut line 39 lies outside the quilt lines so that the material within the filter member can expand outwardly at the edge for most effective attachment and filtration. The diagonal arrangement of the quilt lines is preferred for this.

The pillow of the present construction is formed of a filter material which is stacked in layers and quilted for the purpose of holding the activated charcoal or similar absorption medium between the layers. Other material in addition to or instead of the activated charcoal disclosed can be used to provide absorption of different pollutants as required. The filter member can be used to reduce or remove dirt, dust, pollen, toxins or pollutants such as combustion products including hydrocarbon, carbon monoxide, nitrogen oxides, soot and the like from the air drawn into the interior of the automobile. This improves general health, asthmatic conditions, dust and dirt buildup and moisture buildup. The filter can also prevent entry of debris such as leaves, and other unwanted entrants such as rodents, insects and the like. The panel of the order of 12 by 15 inches is preferably quilted in 2 or 3 inch squares so they can be cut to size and easily installed as explained above into most of the automobiles currently on the market place. The device is fitted as a retrofit arrangement without the necessity for a supporting frame or the modification to the intake hosing.

Figure 5:
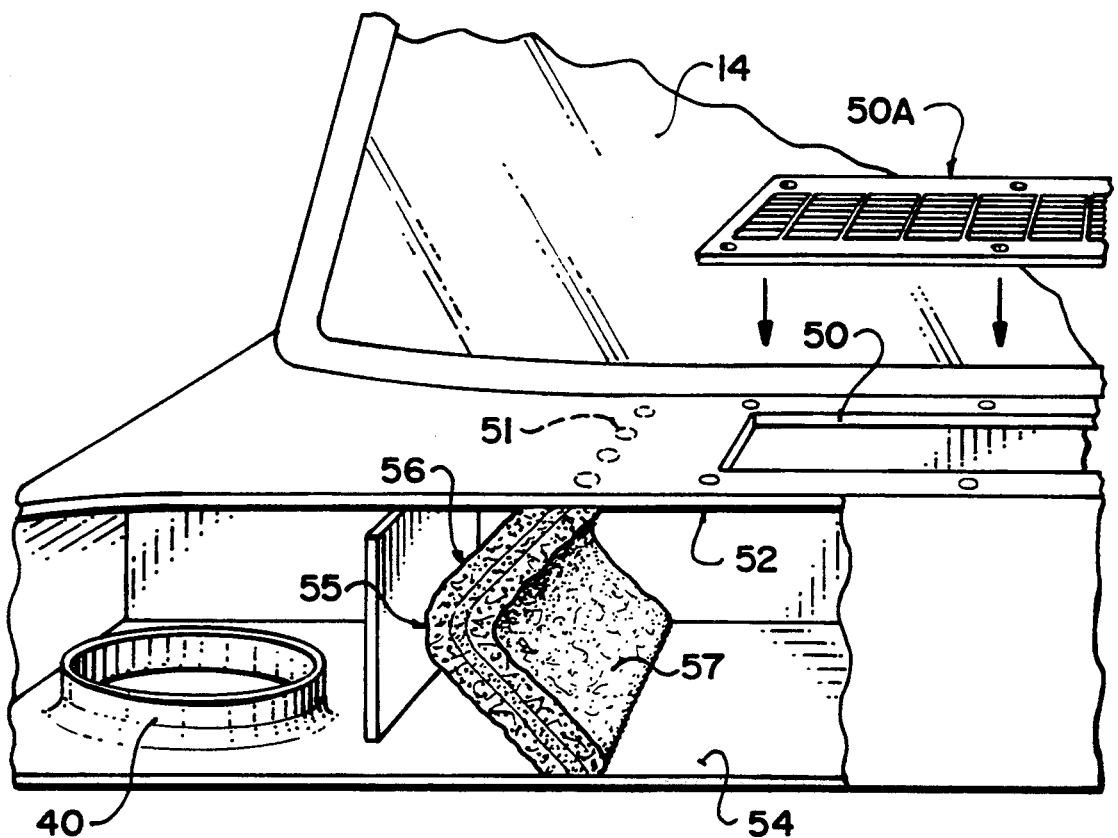
FIG. 5 is a view similar to that of FIG. 1 showing the air intake and the filter member of the present invention in a third installation arrangement.

FIGS. 1, 3 and 5 show three different techniques for the mounting of the filter element within the intake duct.

In FIGS. 1 and 5 the duct includes a cylindrical wall portion 40 through which air is drawn downwardly into a duct for communication to the fan (not shown). In the arrangement in FIG. 1, the duct 40 is readily available simply by the removal of a cover panel 37. In some cases the circular flange opening 40 is covered by a cover element 41. In other cases the cover element 41 is omitted. In the presence of the cover element 41, a plurality of buttons 42 are located on the cylindrical inner wall 45 of the cover 41. The cover thus includes a screen portion 44 and the cylindrical wall 45 leading to a bottom flange 46. The inside surface of the cylindrical wall 45 is itself of course cylindrical and receives a plurality of separate button-type elements 42 attached thereto by adhesive layer 43. Each of the button elements is prefereable circular in plan view but other shapes can be used. Each of the button elements has a plurality of flexible hooks on the front surface thereof, that is the surface opposite to the adhesive layer. The hooks are of the type conventionally used in a hook and loop fastening system. As shown in FIG. 1, the button elements are positioned around the inside surface of the peripheral wall 45 following which the pillow type filter body is inserted into the cover 41 and the edges of the filter body engaged with the hook elements. As the filter element is formed of a non-woven polyester fibrous mesh, the hook elements engage effectively with the mesh to provide a vigorous attachment thereto.

Figure 6:
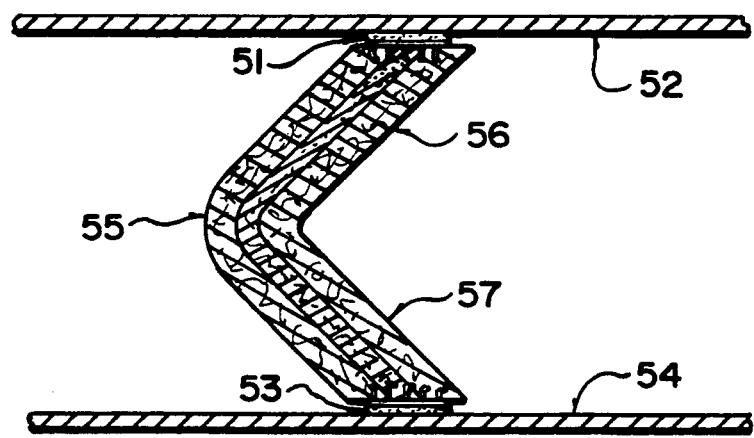
FIG. 6 is a cross-sectional view through the inlet duct of the air intake of FIG. 5.

In FIGS. 5 and 6 is shown an alternative arrangement in which the flange type opening 40 can not be accessed. In this arrangement the duct is accessible through a central opening 50 through which the hand of the user can reach. The user then applies a plurality of the buttons in a first row 51 on an upper wall 52 of the duct and in a second row 53 on a lower wall 54 of the duct. The filter body is then formed into a rectangular shape by cutting as previously described and is folded at a crease line 55 to form a generally V-shaped pillow with two legs 56 and 57 extending to the upper and lower walls 52, 54 respectively. The ends of the legs 56 and 57 are engaged with the row of fastener elements 51 and 53 respectively to hold the filter body in place. This can be achieved by the user folding the filter body and inserting it through the opening and wriggling it to the required position and then pulling slightly back on the legs 56 and 57 to ensure their proper engagement with the hook-type fastener elements.

As a further alternative in the arrangement in FIG. 1, in the situation where there is no cover 41, the fastener elements can be arranged on the inside surface of the flange opening 40 and the filter element cut to the required shape and inserted as a friction fit within the flange engaging the edges with the fastener elements.

Figure 4:
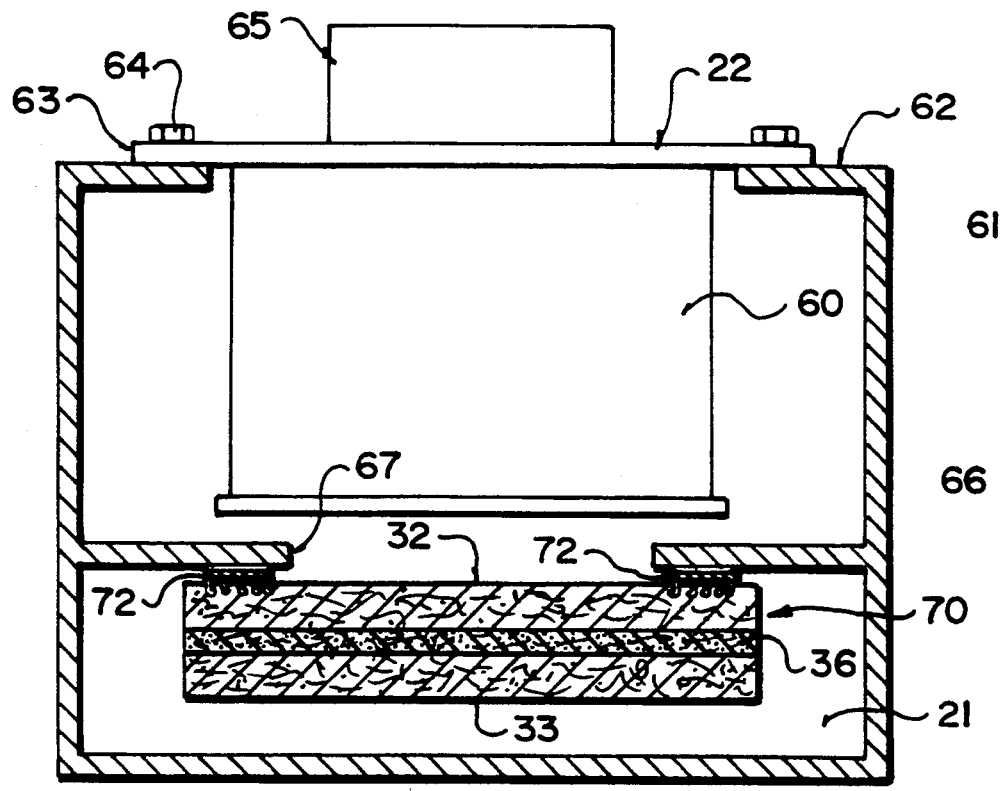
FIG. 4 is a cross-sectional view through the inlet duct of the air intake of FIG. 3.

In FIGS. 3 and 4 is shown a yet further arrangement in which the fan 23 is mounted in the intake duct within the engine compartment. The fan is of the squirrel-cage type having a fan body 60 depending into a chamber 61 below a top plate 62. The flange body has a surrounding flange 63 which engages onto the top surface of the plate 62 and is attached thereto by bolt 64. A motor 65 extends upwardly from the top plate 63. The top plate 62 of the chamber has an opening dimensioned just to receive the body 60 of the fan 23 which extends into the chamber down to an air control plate 66 which extends across the chamber 61. The air control plate has a central opening 67 through which air passes into the end face of the fan housing. The opening 67 is dimensioned to control the air intake in conventional manner.

In this embodiment a filter body 70 is cut to shape first to form a cylindrical peripheral edge having a diameter greater than that of the opening 67. In this installation technique, the user removes the fan housing by extracting the bolts 64 and lifting the fan housing upwardly to expose the plate 66. The user then attaches a ring of the fastener elements 72 on the underside of the plate 66 just around the opening 67. The filter pillow which has been cut to size from the pad previously described is then compressed slightly to pass through the opening 67 and dropped into the lower part of the chamber. The user can then lift the filter upwardly toward the underside of the plate 66 by carefully grasping the fibrous material of the top layer 32 of the filter material and bringing that into contact and engagement with the fastener elements 72. This arrangement therefore acts to hold the filter in place the full periphery on the underside of the plate 66 so that air drawn through the hole 67 firstly passes through the filter.

The filter can be supplied as a kit of parts including the rectangular filter pad for cutting to the required shape and a plurality of the fastener elements in the form of circular buttons having an adhesive layer on one side and the hooks on the opposed side. The user can therefore select the installation technique depending upon the type of vehicle and the construction is used in that vehicle and can them apply the fastener elements as required, cut the filter body tot he required shape and attach it in the manner set forth above.

Since various modifications can be made in my invention as hereinabove described, and many apparently widely different embodiments of same made within the spirit and scope of the claims without departing from such spirit and scope, it is intended that all matter coated in the accompanying specification shall be interpreted as illustrative only and not in a limiting sense.

We claim:

1. A passenger vehicle comprising a vehicle body having a passenger compartment, an air intake duct for drawing exterior air for emission into the passenger compartment, a fan mounted in the duct for drawing air into the intake and a filter member mounted in the intake duct upstream of the fan, the filter member having a filter body arranged for extraction from air flowing therethrough of particulate materials and a filter medium in the falter body for extraction of combustion products, the filter body comprising a plurality of layers connected together to form a pillow, some of the layers comprising a non-woven mat of fibres, the duct having fastening means therein comprising at least one element adhesively fastened to a wall of the duct and having a plurality of flexible hooks carried on the element, the hooks engaging said non-woven mat of fibres to hold the filter body in place.

2. The vehicle according to claim 1 wherein the filter body includes a peripheral edge, a front surface and a rear surface, the fastening means being arranged such that the hooks engage the fibrous mat at the peripheral edge of the filter body.

3. The vehicle according to claim 2 wherein the duct includes two opposed side walls and wherein the falter body is folded along a central crease line to form a V-shape inside elevation with edges of the filter body remote from the crease line being engaged with fastening means on said opposed side walls.

4. The vehicle according to claim 3 wherein the duct includes a circular cylindrical portion and wherein the fastening means comprises a plurality of fastening elements arranged in a cylindrical pattern on the inside surface of the circular cylindrical portion, the fastening means engaging a peripheral edge of the filter body.

5. The vehicle according to claim 1 wherein the duct includes a transverse air control plate arranged immediately upstream of an intake of the fan, the plate having a hole therein through which air is drawn into the fan, the fastening means being arranged on a side of the plate remote from the fan and facing away from the fan, the falter body having an outside periphery of greater dimension than the hole for engaging the plate around the hole, the fastening means engaging a face of the filter body adjacent to and facing the fan intake to hold the filter body against the plate.

* * * * *